United States Patent
Lin et al.

(10) Patent No.: US 8,928,807 B2
(45) Date of Patent: Jan. 6, 2015

(54) PLAYBACK CONTROL METHODS AND SYSTEMS

(75) Inventors: Tzung-I Lin, Taipei (TW); Yi-Chun Lu, Taipei (TW); Chih-Yang Liu, Taipei (TW)

(73) Assignee: Optoma Corporation, Xindian, Taipei (TW)

( * ) Notice: Subject to any disclaimer, the term of this patent is extended or adjusted under 35 U.S.C. 154(b) by 1935 days.

(21) Appl. No.: 12/050,199

(22) Filed: Mar. 18, 2008

(65) Prior Publication Data

US 2009/0016692 A1  Jan. 15, 2009

(30) Foreign Application Priority Data

Jul. 13, 2007  (TW) ................................. 96125578 A

(51) Int. Cl.
 *H04N 11/22* (2006.01)
 *H04N 7/01* (2006.01)
(52) U.S. Cl.
 CPC ..................................... *H04N 7/012* (2013.01)
 USPC .......................................................... 348/445
(58) Field of Classification Search
 None
 See application file for complete search history.

(56) References Cited

U.S. PATENT DOCUMENTS

| | | | |
|---|---|---|---|
| 7,654,678 B1 * | 2/2010 | Runco et al. .................. | 353/101 |
| 2003/0184718 A1 | 10/2003 | Childers et al. | |
| 2005/0094033 A1 * | 5/2005 | Schoner et al. ............... | 348/558 |
| 2007/0040941 A1 * | 2/2007 | Lin et al. ....................... | 348/556 |

FOREIGN PATENT DOCUMENTS

| | | |
|---|---|---|
| JP | 2007078821 | 3/2007 |
| TW | 200606457 | 2/2006 |
| TW | 200609800 | 3/2006 |

OTHER PUBLICATIONS

Taiwanese language Notice of Allowance dated Nov. 24, 2010.
English language translation of abstract of TW 200606457 (published Feb. 16, 2006).
English language translation of abstract of TW 200609800 (published Mar. 16, 2006).
English language translation of abstract of JP 2007078821 (published Mar. 29, 2007).

\* cited by examiner

*Primary Examiner* — Nathan Flynn
*Assistant Examiner* — Omar S Parra
(74) *Attorney, Agent, or Firm* — McClure, Qualey & Rodack, LLP

(57) ABSTRACT

Playback control methods and systems are provided. At least one picture is obtained. The picture corresponds to a frame, and the picture includes a first region and a second region adjacent to the first region. It is determined whether at least one pixel in the first region has a predefined color, and whether at least one pixel in the second region has the predefined color. When the pixel in the first region has the predefined color and the pixel in the second region does not have the predefined color, the first region is removed, and the second region is enlarged to cover an original position of the first region. The enlarged second region is then played back via an anamorphic lens.

20 Claims, 13 Drawing Sheets

PLAYBACK CONTROL METHODS AND SYSTEMS

BACKGROUND OF THE INVENTION

1. Field of the Invention

The disclosure relates generally to playback control methods and systems, and, more particularly to methods and systems that automatically determine the aspect ratio of a video, and maintain the aspect ratio to play back the video.

2. Description of the Related Art

An image playback device, such as a display or a projector may have a predefined aspect ratio. When the aspect rations of a video and the image playback device are different, black borders must be added to the top and bottom, or left and right of the frames of the video. After the black borders are added to the frames, the image playback device can maintain the original aspect ratio of the video to completely play back the frames, without any cutting and loss from the frames.

For example, current movies are filmed using an aspect ratio of 2.35:1. When a movie having an aspect ratio of 2.35:1 is played back in an image playback device having a aspect ratio of 16:9, black borders must be added to the top and bottom of each frame of the movie, as shown in FIG. 1A, such that the frame can be completely displayed in the image playback device, and maintain its original aspect ratio. In this display manner, the completeness and the original aspect ratio of the frames are maintained. However, the effective display areas at the top and bottom of the image playback device are wasted due to the black borders. Therefore, a conventional practice cuts off the back borders from the frame, and enlarges the frame with black borders removed to the complete display area of the image playback device, thus obtaining a frame enlarged in the vertical direction, as shown in FIG. 1B. Then, the frame enlarged in the vertical direction is played back via an anamorphic lens, such that the frame is enlarged in the horizontal direction, returning to the original aspect ratio of 2.35:1, as shown in FIG. 1C.

However, in the conventional practice, users must determine the aspect ratio of the frames using their own naked eyes, and manually switch the image playback device to perform related operations. For example, when the aspect rations of the frames and the image playback device are different, users must indicate to the image playback device to cut off back borders from the frames. When the aspect rations of the frames and the image playback device are the same, users must indicate to the image playback device to do nothing and maintain the original frames for playback. Additionally, the anamorphic lens may be fixed or removable. When the anamorphic lens is fixed, since all frames of a video must be played and horizontally enlarged via the anamorphic lens, the displayed frames may be distorted when the video does not have an aspect ratio of 2.35:1. Further, when cut off and vertical enlargement operations are performed on the frames having an aspect ratio other than the aspect ratio of 2.35:1, frame content is lost, thus reducing the completeness of frames.

BRIEF SUMMARY OF THE INVENTION

Playback control methods and systems are provided.

In an embodiment of a playback control method, at least one picture is obtained. The picture corresponds to a frame, and the picture includes a first region and a second region adjacent to the first region. It is determined whether at least one pixel in the first region has a predefined color, and whether at least one pixel in the second region has the predefined color. When the pixel in the first region has the predefined color and the pixel in the second region does not have the predefined color, the first region is removed, and the second region is enlarged to cover an original position of the first region. The enlarged second region is then played back via an anamorphic lens.

An embodiment of a playback control system includes a storage unit, an anamorphic lens, and a processing unit. The storage unit includes at least one picture. The picture corresponds to a frame, and the picture includes a first region and a second region adjacent to the first region. The processing unit determines whether at least one pixel in the first region has a predefined color, and whether at least one pixel in the second region has the predefined color. When the pixel in the first region has the predefined color and the pixel in the second region does not have the predefined color, the processing unit removes the first region, and enlarges the second region to cover an original position of the first region. The processing unit then plays back the enlarged second region via the anamorphic lens.

Playback control methods and systems may take the form of a program code embodied in a tangible media. When the program code is loaded into and executed by a machine, the machine becomes an apparatus for practicing the disclosed method.

Other objectives, features and advantages of the present invention will be further understood from technological features disclosed by the embodiments of the present invention. Wherein there are shown and described preferred embodiments of this invention, are simply illustrations of modes best suited to carry out the invention.

BRIEF DESCRIPTION OF THE DRAWINGS

The invention will become more fully understood by referring to the following detailed description with reference to the accompanying drawings, wherein.

DETAILED DESCRIPTION OF THE INVENTION

It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 2:
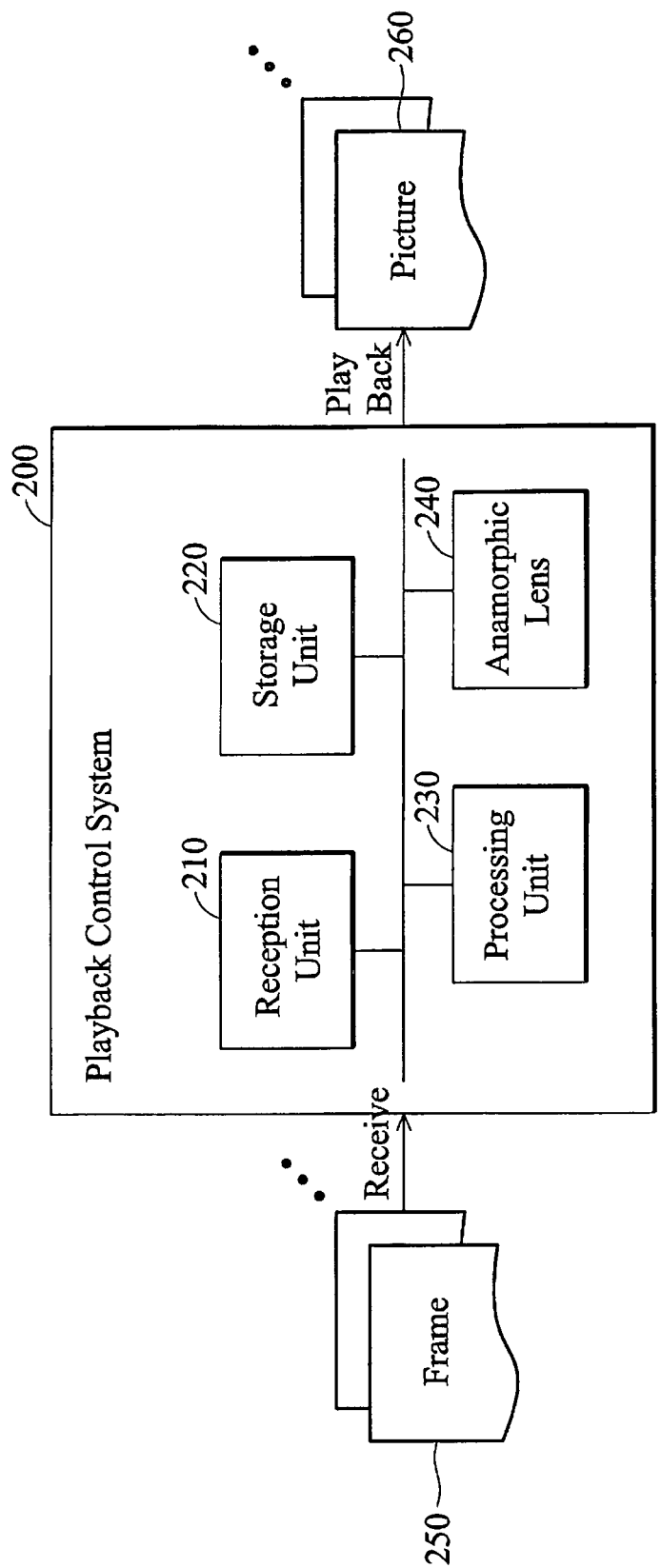
FIG. 2 is a schematic diagram illustrating an embodiment of a playback control system of the invention.

FIG. 2 is a schematic diagram illustrating an embodiment of a playback control system of the invention.

The playback control system 200 may be an image playback device, such as a projector. The playback control system 200 includes a reception unit 210, a storage unit 220, a processing unit 230, and an anamorphic lens 240. The reception unit 210 receives at least one frame 250 of a video. It is understood that the frame 250 of the video has an original aspect ratio. When the original aspect ratio of the frame 250 is different with an aspect ratio that may be displayed by the image playback device, the edges, such as the top and bottom or left and right of the frame 250 are added borders with a predefined color, such as black, such that the frame 250 becomes a processed picture 260. The picture includes a specific first region and a second region adjacent to the first region. It is understood that, when the original aspect ratio of the frame 250 is the same with the aspect ratio that may be displayed by the image playback device, the frame 250 is the picture that may be directly played back by the image playback device. In some embodiments, the operations for adding borders to the frame may be performed in the playback control system 200. In some embodiments, the operations for adding borders to the frame may be performed in advance, before the frame enters the playback control system 200. The picture 260 may be temporarily stored in the storage unit 220. The processing unit 230 performs related determinations and processes of the picture 260, and performs the playback control methods of the application. The processing unit 230 may determine to directly play back (display) the picture 260, or play back the picture 260 with related processes via the anamorphic lens 240. It is noted that the anamorphic lens 240 may be a fixed or removable lens. The picture 260 played back via the anamorphic lens 240 is enlarged in a direction, such as horizontal or vertical.

Figure 3:
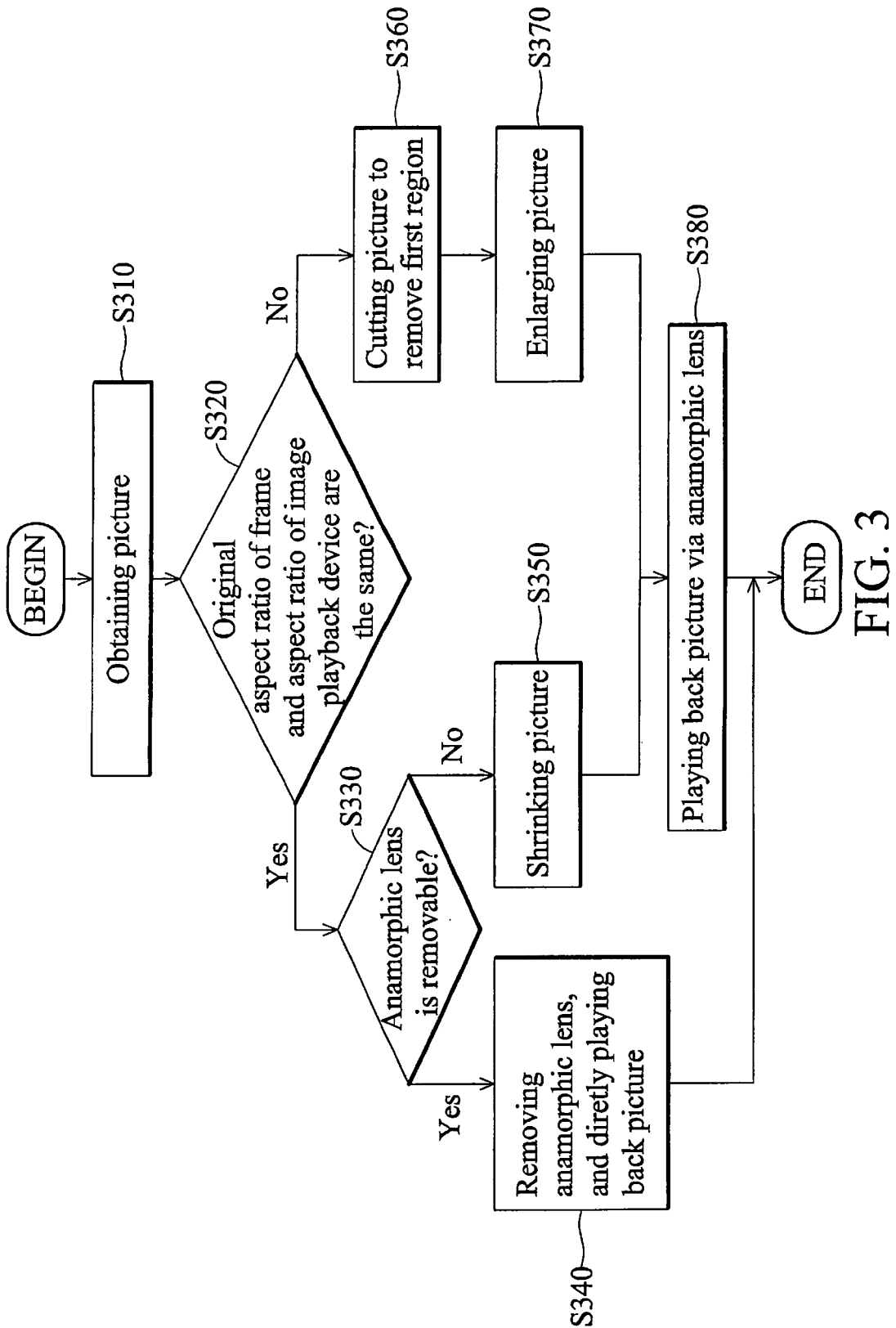
FIG. 3 is a flowchart of an embodiment of a playback control method of the invention.

FIG. 3 is a flowchart of an embodiment of a playback control method of the invention.

Figure 4:
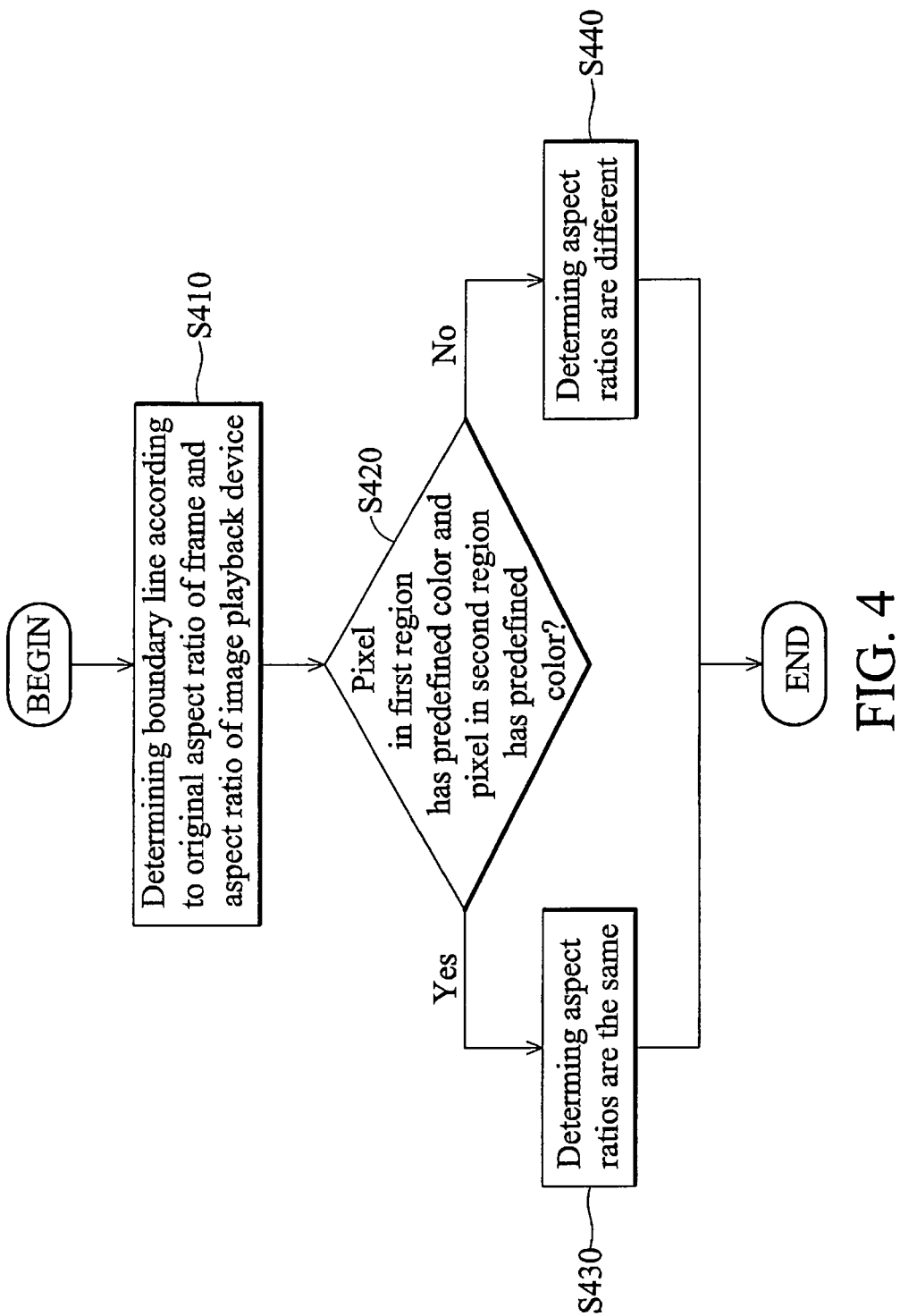
FIG. 4 is a flowchart of an embodiment of a method of the invention for determining whether an original aspect ratio of a frame and an aspect ratio of an image playback device for playing back pictures are the same.
Figure 5:
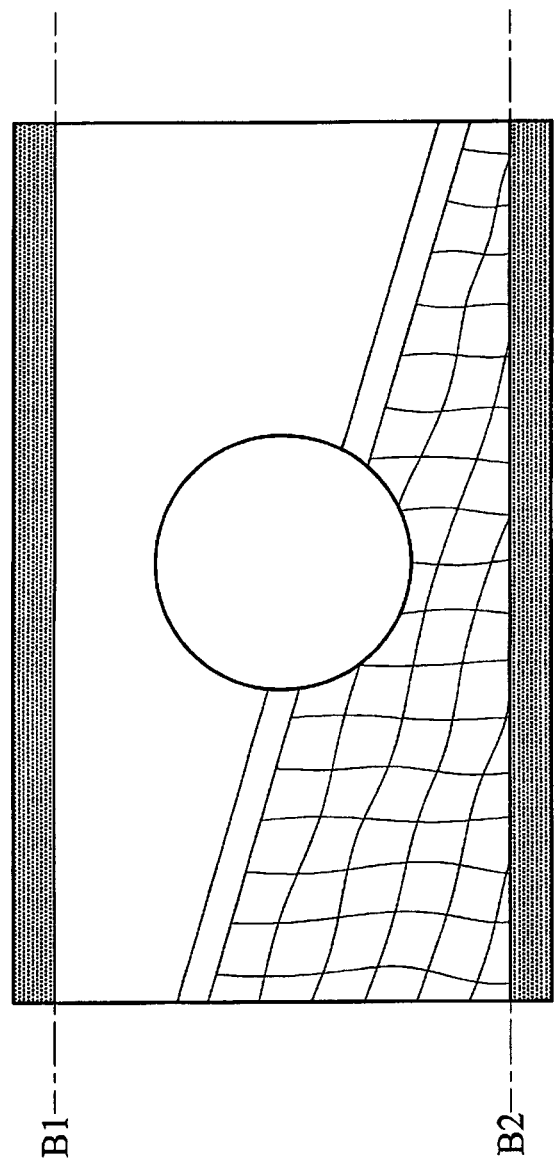
FIGS. 5 and 6 are schematic diagrams illustrating boundaries in pictures.
Figure 6:
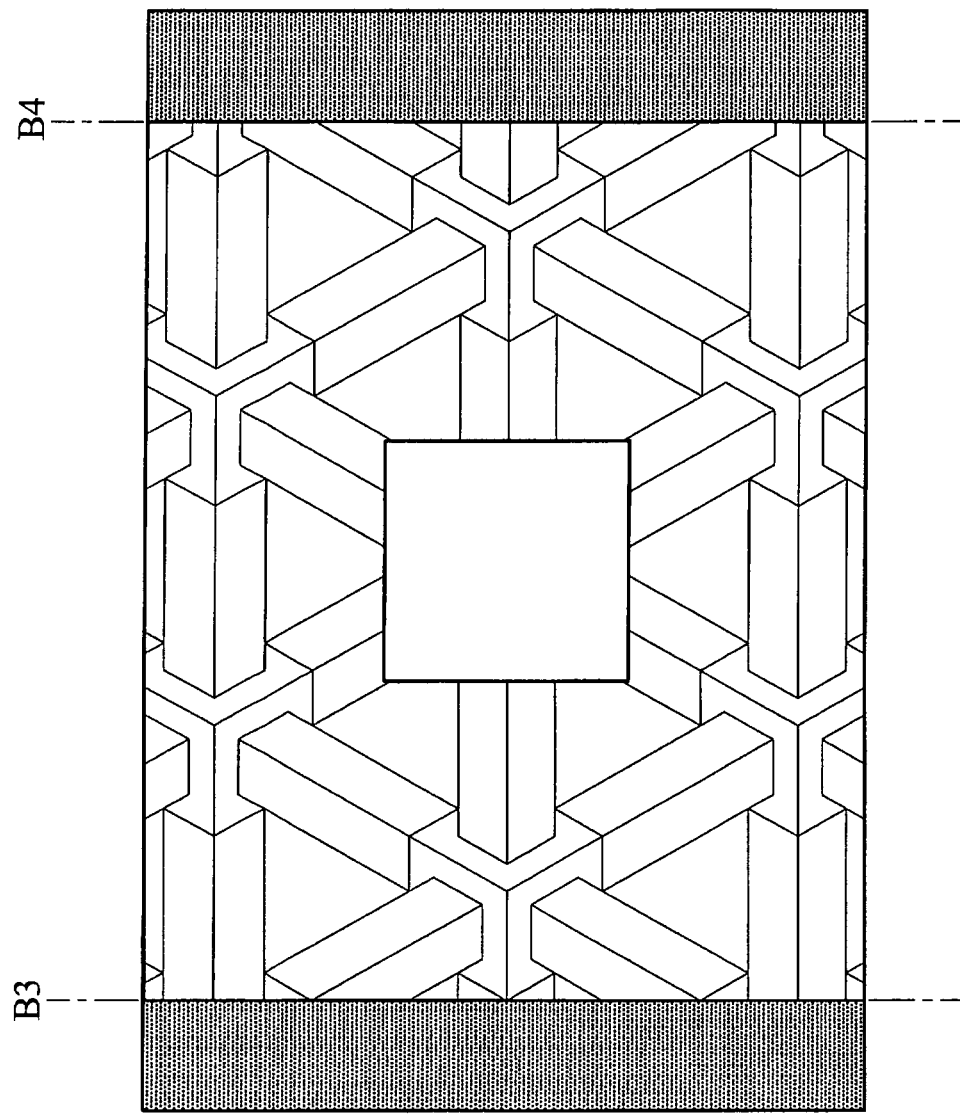

In step S310, at least one picture is obtained. The picture corresponds to a frame of a video. In step S320, it is determined whether the original aspect ratio of the frame and the aspect ratio of the image playback device for playing back pictures are the same. FIG. 4 is a flowchart of an embodiment of a method of the invention for determining whether an original aspect ratio of a frame and an aspect ratio of an image playback device for playing back pictures are the same. In step S410, the position of at least one boundary line between the first region and the second region is determined according to the original aspect ratio of the frame and the aspect ratio of the image playback device. FIGS. 5 and 6 respectively illustrate pictures with black borders, representing frames with original aspect ratios of 2.35:1 and 4:3, respectively played back by an image playback device with an aspect ratio of 16:9. As shown in the figures, the picture in FIG. 5 has two boundaries B1 and B2, and the picture in FIG. 6 has two boundaries B3 and B4. It is understood that, in some embodiments, the positions of boundaries corresponding to various combinations of the original aspect ratio of the frame and the aspect ratio of the image playback device may be directly recorded in the system. In step S420, it is determined whether at least one pixel in the first region above the boundary line has a predefined color, such as black, and whether at least one pixel in the second region under the boundary line has the predefined color. In some embodiments, FIG. 5 for example, step S420 determines whether the color of a pixel in the upper region of the boundary line B1 is black, and the color of a pixel in the lower region of the boundary line B1 is not black, and/or determines whether the color of a pixel in the lower region of the boundary line B2 is black, and the color of a pixel in the upper region of the boundary line B2 is not black. It is understood that it is determined whether a pixel has the predefined color by determining whether the pixel value of the pixel conforms to a specific pixel value corresponding to the predefined color. In some embodiments, step S420 may determine whether all pixels in the first region have the predefined color, and whether all pixels in the second region have the predefined color. In some embodiments, a first specific line (row or column) and a second specific line may be first respectively selected from the first region and the second region, and in step S420, it is determined whether all or a predefined number of pixels on the first specific line in the first region have the predefined color, and whether all or a predefined number of pixels on the second specific line in the second region have the predefined color. If so (the pixel in the first region has the predefined color and the pixel in the second region has the predefined color, Yes in step S420), in step S430, it is determined the original aspect ratio of the frame and the aspect ratio of the image playback device are the same. If not (the pixel in the first region does not have the predefined color or the pixel in the second region does not have the predefined color, No in step S420), in step S440, it is determined the original aspect ratio of the frame and the aspect ratio of the image playback device are different. It is understood that, in some embodiments, when the pixel in the first region of a successive predefined number, such as 3 times respectively has the predefined color, and the pixel in the second region of a successive predefined number, such as 3 times respectively does not have the predefined color, the original aspect ratio of the frame and the aspect ratio of the image playback device are determined to be different.

Figure 1A:
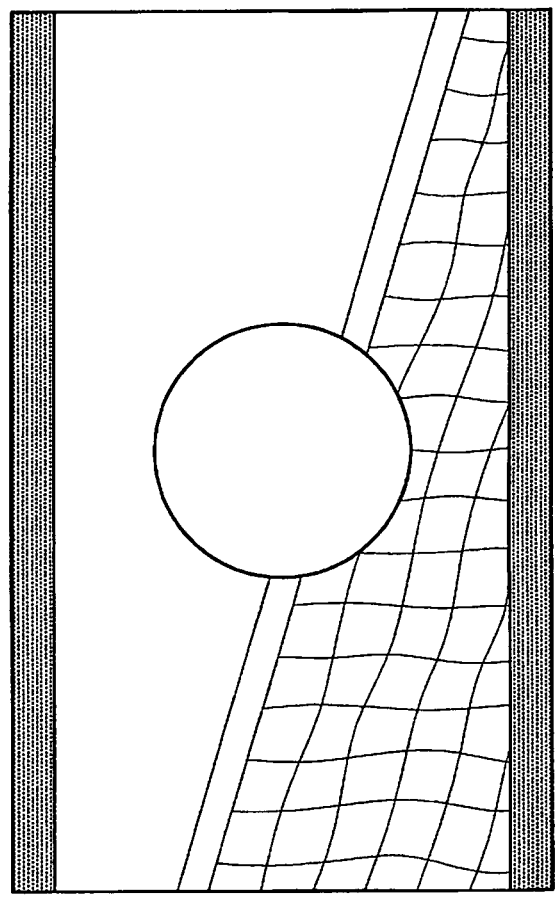
FIG. 1A shows a picture having black borders at the top and bottom of the frame.
Figure 1B:
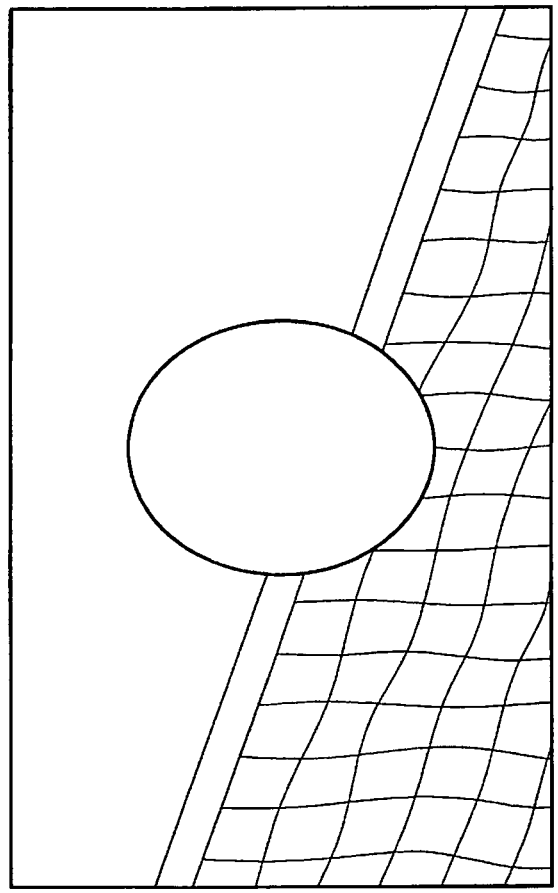
FIG. 1B shows a picture representing the picture in FIG. 1A with black borders removed and the picture vertical enlarged.
Figure 1C:
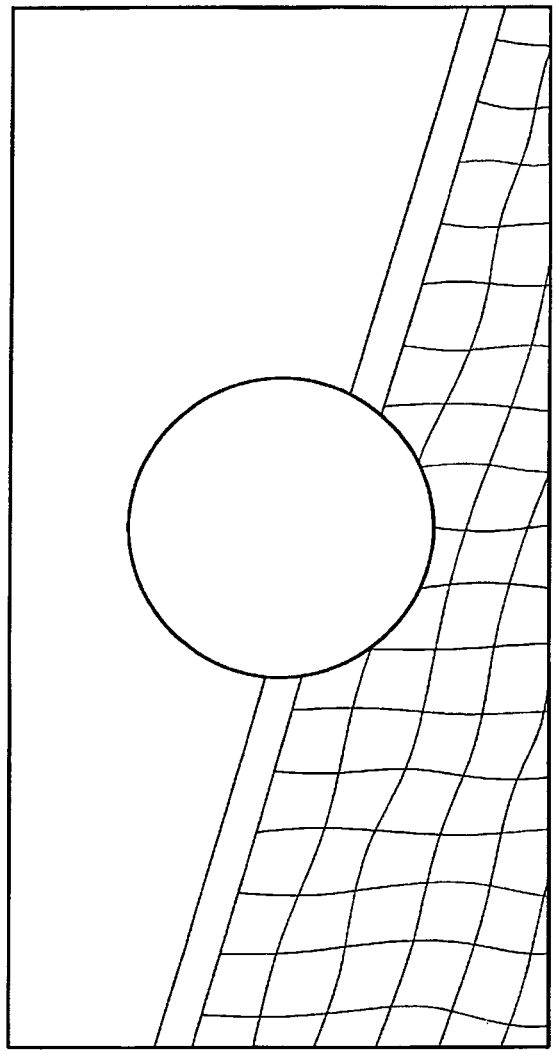
FIG. 1C shows a picture representing the picture in FIG. 1B played back via an anamorphic lens.
Figure 7A:
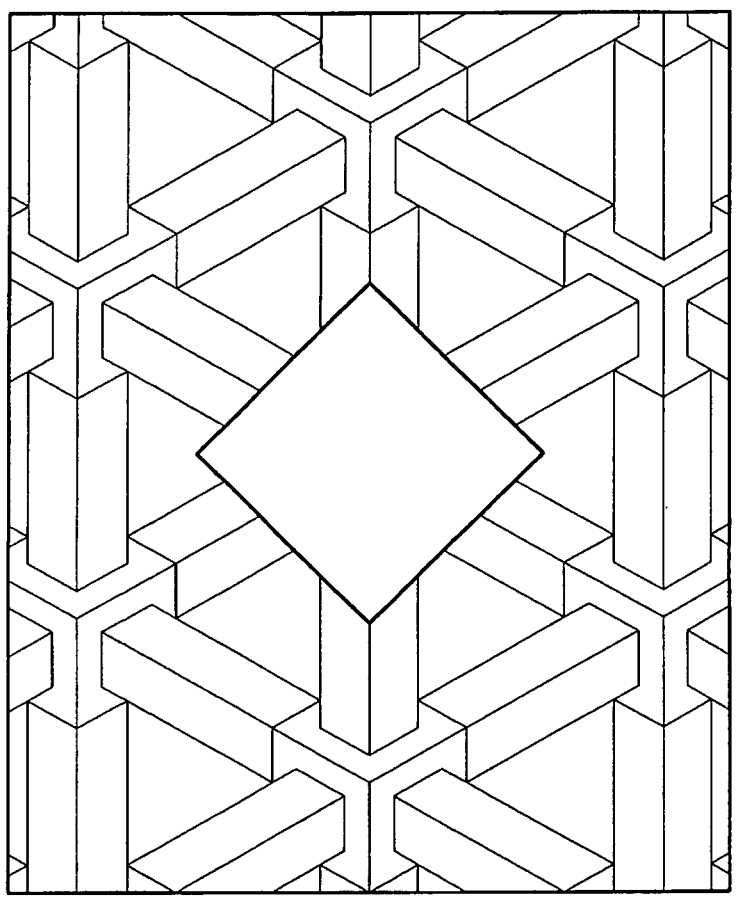
FIG. 7A shows a picture.
Figure 7B:
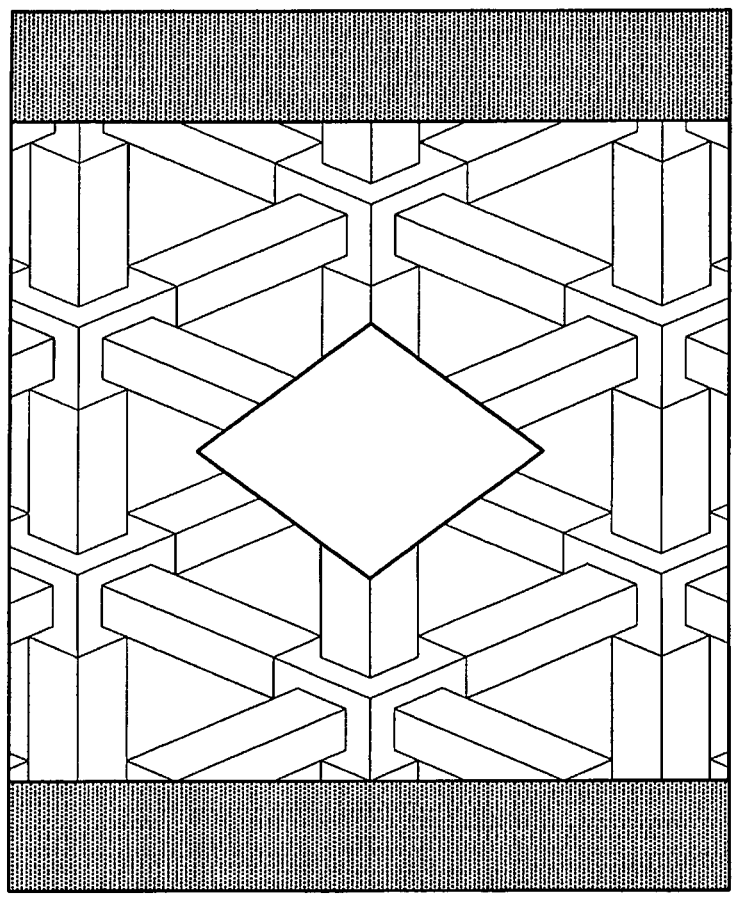
FIG. 7B shows a picture representing the picture in FIG. 7A horizontally shrunk.
Figure 7C:
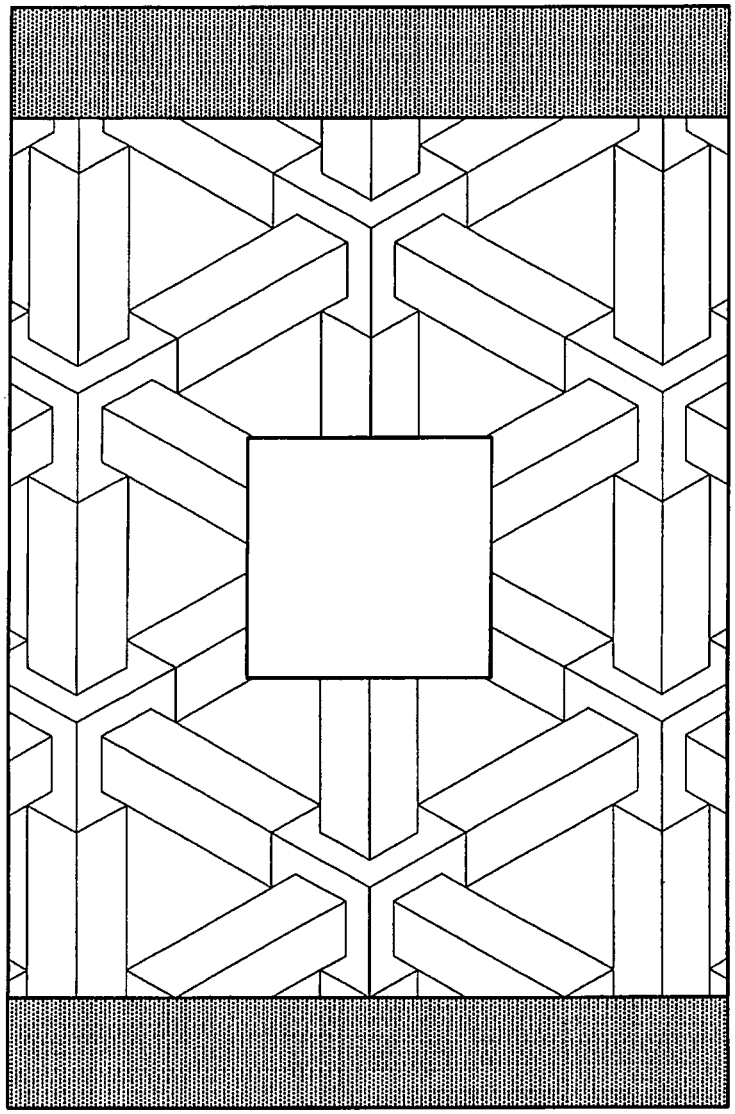
FIG. 7C shows a picture representing the picture in FIG. 7B played back via an anamorphic lens.

If the original aspect ratio of the frame and the aspect ratio of the image playback device are the same (Yes in step S320), in step S330, it is determined whether the anamorphic lens is removable. If the anamorphic lens is removable (Yes in step S330), in step S340, the anamorphic lens is removed, and the picture is directly played back. That is the anamorphic lens is not used for playback. If the anamorphic lens is not removable (No in step S330), in step S350, the picture is shrunk in a direction parallel to the boundary line, and in step S380, the shrunk picture is played back via the anamorphic lens, such that the shrunk picture is enlarged in the direction parallel to the boundary line. It is noted that the enlarged picture by the anamorphic lens may maintain the original aspect ratio of the corresponding frame. For example, if the original aspect ratio of the frame and the aspect ratio of the image playback device are the same, the picture in FIG. 7A is horizontally shrunk, as shown in FIG. 7B. Then, the shrunk picture is played back via the anamorphic lens, such that the shrunk picture is enlarged, as shown in FIG. 7C. If the original aspect ratio of the frame and the aspect ratio of the image playback device are different (No in step S320), in step S360, the first region in the picture is removed, and in step S370, the second region (the picture after the first region is removed) is enlarged to cover an original position of the first region, as shown in FIG. 1B. Then, in step S380, the picture (enlarged second region) is played back via the anamorphic lens, such that the picture is enlarged in the direction parallel to the boundary line. The enlarged picture by the anamorphic lens may maintain the original aspect ratio of the corresponding frame, as shown in FIG. 1C.

Figure 8A:
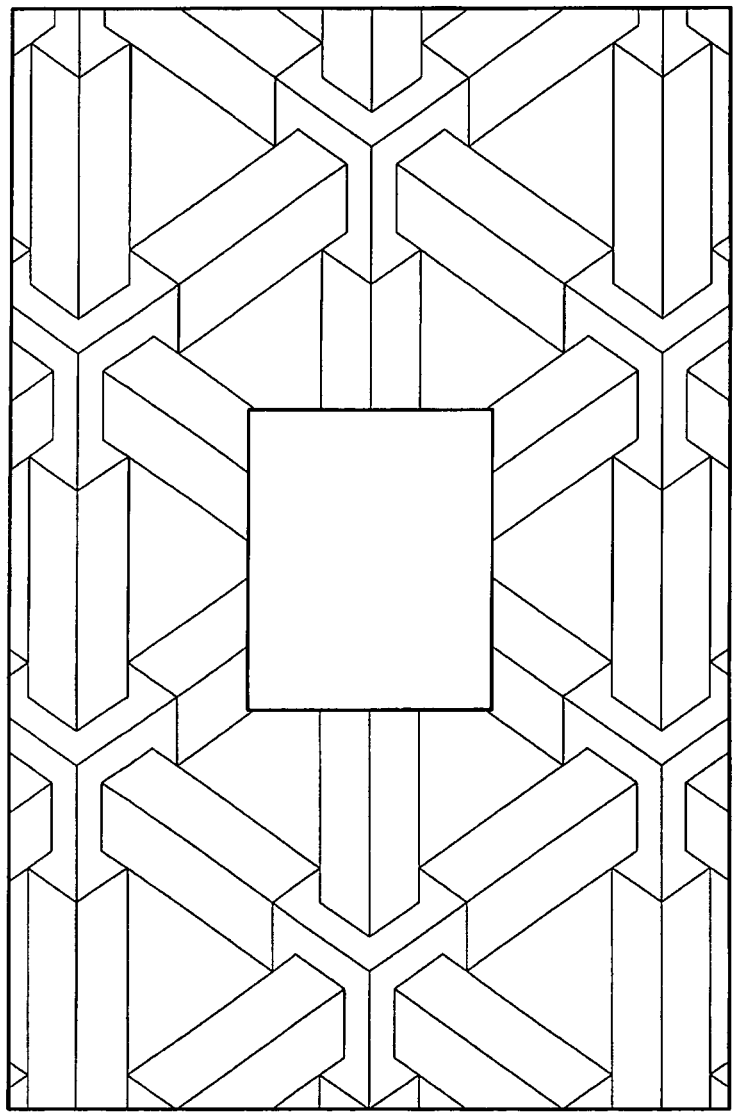
FIG. 8A shows a picture representing the picture in FIG. 6 with black borders removed and the picture horizontally enlarged.
Figure 8B:
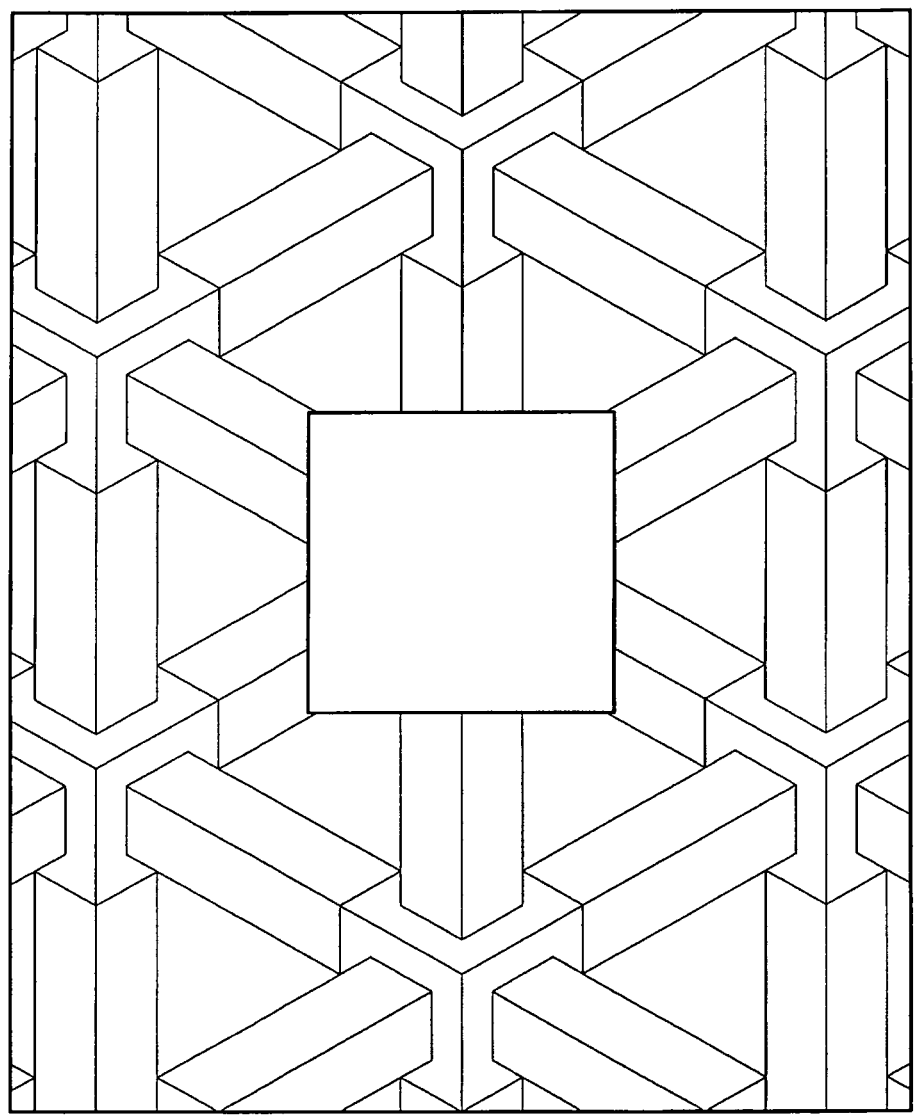
FIG. 8B shows a picture representing the picture in FIG. 8A played back via an anamorphic lens.

Referring to FIG. 6 for an example, since the original aspect ratio of the frame and the aspect ratio of the image playback device are different, a specific region (first region) in the left of the boundary line B3 and a specific region (first region) in the right of the boundary line B4 are removed. The picture with specific regions removed is then horizontally enlarged, as shown in FIG. 8A. Then, the enlarged picture is played back via the anamorphic lens, such that the enlarged picture is further vertically enlarged to maintain the original aspect ratio of the corresponding frame, as shown in FIG. 8B.

It is understood that the above embodiments discuss the examples of frames with original aspect ratios of 2.35:1 and 4:3 to be played back by an image playback device with an aspect ratio of 16:9. However, the invention is not limited thereto, various aspect ratios comprising 2.35:1, 1.85:1, 16:9, 16:10, and/or 4:3 for frames and image playback devices can be also applied in the invention.

Therefore, the playback control methods and systems of the application may automatically determine the aspect ratio of a video, and determine whether to use an anamorphic lens for playing back the video, thereby maintaining the original aspect ratio of the video during playback.

Playback control methods and systems, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A playback control method, comprising following steps:
    obtaining at least one picture, wherein the picture corresponds to a frame, and the picture comprises a first region and a second region adjacent to the first region;
    determining whether all pixels in the first region have a predefined color;
    determining whether all pixels in the second region have the predefined color;
    determining a position of a boundary line between the first region and the second region according to an original aspect ratio of the frame and an aspect ratio of an image playback device for playing back the picture;
    when all of the pixels in the first region have the predefined color and all of the pixels in the second region do not have the predefined color, removing the first region, and enlarging the second region to cover an original position of the first region; and
    playing back the enlarged second region via an anamorphic lens;
    wherein the playback control method is performed automatically without user intervention.

2. The method of claim 1, wherein after the enlarged second region is played back via the anamorphic lens, the enlarged second region is further enlarged in a direction parallel to the boundary line.

3. The method of claim 2, wherein after the enlarged second region is played back via the anamorphic lens, the enlarged second region is further enlarged to maintain the original aspect ratio of the frame.

4. The method of claim 1, further comprising following steps:
    when the pixel in the first region does not have the predefined color or the pixel in the second region has the predefined color, shrinking the picture in a direction parallel to the boundary line; and
    playing back the shrunk picture via the anamorphic lens.

5. The method of claim 4, wherein the enlarged second region after the anamorphic lens is further enlarged in a direction parallel to the boundary line to maintain the original aspect ratio of the frame.

6. The method of claim 1, wherein the at least one pixel in the first region comprises a plurality of pixels on a first specific line in the first region, and the at least one pixel in the second region comprises a plurality of pixels on a second specific line in the second region.

7. The method of claim 1, wherein the pixel in the first region or the second region is determined whether to have the predefined color by determining whether a pixel value of the pixel conforms to a specific pixel value corresponding to the predefined color.

8. The method of claim 1, wherein the predefined color comprises black.

9. The method of claim 1, further comprising when the pixel in the first region does not have the predefined color or the pixel in the second region has the predefined color, directly playing back the picture.

10. The method of claim 1, wherein whether the pixel in the first region has the predefined color is determined after a first predefined number of successive determining times, and whether the pixel in the second region has the predefined color is determined after a second predefined number of successive determining times.

11. A playback control system, comprising:
a storage unit, comprising at least one picture, wherein the picture corresponds to a frame, and the picture comprises a first region and a second region adjacent to the first region;
an anamorphic lens; and
a processing unit, determining whether all pixels in the first region have a predefined color, determining whether all pixels in the second region have the predefined color, determining a position of a boundary line between the first region and the second region according to an original aspect ratio of the frame and an aspect ratio of an image playback device for playing back the picture, when all of the pixels in the first region have the predefined color and all of the pixels in the second region do not have the predefined color, removing the first region, and enlarging the second region to cover an original position of the first region, and playing back, automatically without user intervention, the enlarged second region via the anamorphic lens.

12. The system of claim 11, wherein after the enlarged second region is played back via the anamorphic lens, the enlarged second region is further enlarged in a direction parallel to the boundary line.

13. The system of claim 12, wherein after the enlarged second region is played back via the anamorphic lens, the enlarged second region is further enlarged to maintain the original aspect ratio of the frame.

14. The system of claim 11, wherein when the pixel in the first region does not have the predefined color or the pixel in the second region has the predefined color, the processing unit further shrinks the picture in a direction parallel to the boundary line, and plays back the shrunk picture via the anamorphic lens.

15. The system of claim 14, wherein the enlarged second region after the anamorphic lens is further enlarged in a direction parallel to the boundary line to maintain the original aspect ratio of the frame.

16. The system of claim 11, wherein the at least one pixel in the first region comprises a plurality of pixels on a first specific line in the first region, and the at least one pixel in the second region comprises a plurality of pixels on a second specific line in the second region.

17. The system of claim 11, wherein the processing unit determines whether the pixel in the first region or the second region has the predefined color by determining whether a pixel value of the pixel conforms to a specific pixel value corresponding to the predefined color.

18. The system of claim 11, wherein the predefined color comprises black.

19. The system of claim 11, wherein when the pixel in the first region does not have the predefined color or the pixel in the second region has the predefined color, the processing unit directly plays back the picture.

20. The system of claim 11, wherein the processing unit determines whether the pixel in the first region has the predefined color after a first predefined number of successive determining times, and determines whether the pixel in the second region has the predefined color after a second predefined number of successive determining times.

* * * * *